United States Patent [19]

Nakazawa et al.

[11] 3,983,564

[45] Sept. 28, 1976

[54] IMAGE RECORDING MEMBER

[75] Inventors: Mitsunobu Nakazawa, Tokyo; Yoshiaki Araki, Yokohama; Masahiro Haruta, Funabashi; Kunio Satomi, Yokohama, all of Japan

[73] Assignee: Canon Kabushiki Kaisha, Tokyo, Japan

[22] Filed: Aug. 18, 1975

[21] Appl. No.: 605,469

Related U.S. Application Data

[63] Continuation of Ser. No. 509,684, Sept. 26, 1974, abandoned.

[30] Foreign Application Priority Data

Sept. 28, 1973 Japan .............................. 48-109963

[52] U.S. Cl. .................................... 346/1; 96/90 R; 106/307; 346/135; 428/411

[51] Int. Cl.² .......................................... G01D 15/34

[58] Field of Search ................... 346/1, 135; 204/2; 106/307; 428/411; 423/448; 96/90 R

[56] References Cited

UNITED STATES PATENTS

| | | | |
|---|---|---|---|
| 1,939,232 | 12/1933 | Sheppard | 346/135 X |
| 3,158,506 | 11/1964 | Ellison | 346/134 |
| 3,509,088 | 4/1970 | Dalton | 346/135 X |
| 3,510,304 | 5/1970 | Fichter | 96/90 R |

*Primary Examiner*—Joseph W. Hartary
*Attorney, Agent, or Firm*—Fitzpatrick, Cella, Harper & Scinto

[57] ABSTRACT

An image recording member of a type, wherein a recording layer comprising graphite fluoride and a fluorine acceptor is formed on a supporting body or substrate, and an image is recorded on such recording member by applying energy thereto.

36 Claims, No Drawings

IMAGE RECORDING MEMBER

This is a continuation of application Ser. No. 509,684, filed Sept. 26, 1974, now abandoned.

BACKGROUND OF THE INVENTION

1. Field of the Invention

The present invention is concerned with an image recording member which is capable of recording an image thereon by merely supplying energy such as external heat, electric current, light rays, and so on without the need for particular chemicals which is free from periodical maintenance and which is suitable for use in the dry-reproduction process. More particularly, the invention relates to an image recording member which is applicable to various recording materials for receiving signals such as those from a facsimile, outputs from computers and their terminal equipment, data of various kinds from measuring instruments for industrial, medical, business, and various other purposes, and various photographic materials and reproduction materials.

2. Description of Prior Art

With the development of the so-called information oriented society in recent years, various image recording apparatuses and recording materials therefor, which have so far been used mainly in the professional fields, have now gained their popularity in general offices and even in the for business as well as private uses. In this consequence, various stringent requirements have come to be imposed on these reproduction apparatuses and the recording materials therefore mostly from the standpoint of convenient and easy handlings. Particularly desirable is a recording material which is capable of recording an image thereon from energy sources such as light rays, electric current, external heat, and so forth without the need for chemicals, and which is free from periodical maintenance and suitable for use in the dry reproduction process.

Such a recording material has been disclosed in various patents. There has previously been disclosed, for example, a dry silver as taught in U.S. Pat. No. 3,457,075, etc.; photosensitive recording material having therein free radical photographic elements as the principal constituent, or the so-called electrical discharge recording material, in which a surface layer is perforated by a recording needle, or a stylus which electrically produces heat to remove the surface layer and to expose a coloured layer underneath such surface layer as disclosed in Japanese Patent Publication Nos. 37-13032, 37-13033, and 37-13034, electrically sensitive recording material in which an image is formed by reducing a metallic compound dispersed in an electrically insulative resin to a free metal by means of electric conduction as proposed in Japanese Patent Publication Nos. 38-22341, and 44-29630; and, a heat-sensitive recording material as taught in Japanese Patent Publication No. 45-14039;.

These recording materials, however, have not yet attained satisfactory performances in respect of color tone, contrast, and other qualities of the recorded image as well as shelf life, image stability on the recording material, and hygienic safety of the raw materials against pollution, and so on.

SUMMARY OF THE INVENTION

With the foregoing problems in mind, it is the principal object of the present invention to provide an image recording member which is capable of recording an image thereon by merely supplying energy such as external heat, electric current, light rays, and so forth without the need for particular chemicals and which is free from any periodical maintenance and is suitable for use in the dry reproduction process.

It is another object of the present invention to provide an image recording member which is superior in such characteristics as color tone, contrast, and other qualities of the recorded image as well as resistance against light rays.

It is still another object of the present invention to provide an image recording member which can be used extensively as a heat-sensitive recording material, electrically sensitive recording material, photosensitive recording material, etc. depending on the form of energy to be supplied in accordance with the information signal of the image to be reproduced.

It is a further object of the present invention to provide an image recording member having a high degree of whiteness in the background color, and a very smooth feel.

It is a still further object of the present invention to provide an image recording member which can be produced by very simple production process.

It is still another object of the present invention to provide an image recording member which has no toxicity and is thus safe to produce and use.

It is a still further object of the present invention to provide an image recording member which is highly stable over a long period of time.

According to the present invention, in one aspect thereof, there is provided an image recording member which comprises a supporting base layer, or a substrate, of an appropriate material, and a recording layer provided on the base layer which comprises at least one kind of graphite fluoride and at least one kind of fluorine acceptor.

According to another aspect of the present invention, there is provided a method for forming an image, i.e. visible information, on the abovementioned recording layer of the image recording member which method comprises the steps of applying various forms of energy to the recording layer in accordance with the information signal from the image to be reproduced.

The foregoing objects as well as the detailed construction of the image recording layer according to the present invention will become more apparent from the following full disclosure of the invention when read in conjunction with some preferred examples thereof.

DESCRIPTION OF THE PREFERRED EMBODIMENTS

The abovementioned graphite fluoride to be used in the present invention is an inorganic compound comprising carbon and fluorine. In more detail, it is a graphite type laminar compound which may be represented by the general formula of $(CF_x)_n$, where $0 < x \leq 1$ and $n$ is a number larger than zero. Attempts have heretofore been made to apply this inorganic high molecular carbon fluoride only as a lubricant or as an abrasive agent. According to the present invention, however, this compound has now been found useful as a material for image recording. Incidentally, this compound per se is well known, and is called polycarbon monofluoride when $x = 1$ in the abovementioned general formula, i.e., 100% fluorination. The polycarbon monofluoride is white.

Carbon fluoride is produced in general by using raw material carbon such as petroleum coke, coal coke, natural graphite, synthetic graphite, charcoal, carbon black, binder carbon, and so forth, alone or in combination to form a covalent bond with fluorine.

For actual methods of production of such carbon fluoride, reference should be made to the following literature: "Ceramic", vol.4 (4), p.301. 1969; "Denki Kagaku (Electrochemistry)", vol.31, pp.756–761, 1963; "Denki Kagaku (Electrochemistry)", vol.35. pp.19–23, 1967.

for a graphite fluoride capable of being used according to present invention it should preferably have a high rate of fluorination (a rate of reaction of fluorine to 1 carbon) and a high degree of whiteness, although the compound is not limited to one having 100% fluorination. That is to say, in the afore-mentioned general formula for carbon fluoride, if the value of $x$ is not less than 0.5, or if it is not less than 0.4 when used together with a compound containing therein zeolitic water, such graphite fluoride is suitable for the purpose of the present invention. While the graphite fluoride is a solid body having the laminar structure as mentioned in the foregoing, it is preferable that, in the practice of the present invention, the compound be used in the form of a fine powder having a particle diameter of less than 7 microns, or more specifically, falling within a range of from 3 to 5 microns.

Graphite fluoride is usually perfectly white, or at least substantially appears to be white. This color tone appears to be co-related with the rate of fluorination. Such perfect whiteness or near whiteness holds true with the compound having a high rate of fluorination. However, when the graphite fluoride is subjected to heat energy in a direct or indirect manner in the presence of a fluorine acceptor (in the present invention, the term "fluorine acceptor" is a general name for substance which are capable of developing color, or changing color from white to black in the main, when it is subjected to energy application together with the graphite fluoride), the compound becomes perfectly black or exhibits a color very close to black. In this color development, no external chemicals whatsoever are required, and the color changes visibly in the perfect dry process. Further, the color-developed image thus obtained is a carbon-based image, hence it is highly stable against light rays.

As example of a fluorine acceptor useful for the purpose of the present invention, the following various compounds are illustrative.

1. Aliphatic Amines such as, for example, dodecamethylene diamine, octadecamethylene diamine, N, N′-diacetylethylene diamine, acetoamide, traillyl amine, N, N′-bis 3-aminopropylputrescine, 1-carbamylethylene imine, 1-para-toluenesulfonylethylene-imine, 2-aminopropane-1, 3-diol, tris (oxymethyl) amino methane, 1, 2-diaminopropane-3-ol, and so on.

2. Amino Acids such as, for example, glycine, N-phenyl glycine, dimethyl glycine, imino-diacetic acid, guanidino acetic acid, α-amino-propionic acid, and so forth.

3. Aromatic Amine compounds such as, for example, dianilinomethane, N, N′-diphenyl-1, 2-diaminoethane, anilinoacetone, diphenylamine, triphenylamine, formanilide, acetoanilide, ortho-phenylene diamine, meta-phenylene-diamine, para-phenylene diamine, para-aminoacetoanilide, 2, 6-diaminotoluene, 4-aminodiphenyl amine, Michler's ketone, N-N-ethylene-bis-N-phenylhydrazine, tetramethyl-diaminodiphenyl methane, para-tolylhydrazine, diphenyl-hydrazine, diphenyl-nitrosoamine, 2-phenyl-semi-carbazide, αacetyl phenyl hydrazine, and so forth.

4. Heterocyclic Compounds such as, for example, hexamethylene tetramine, N-phenyl-3-pyrazolidone, acridine, pyridine, phenazine, carbazole, phenothiazine, benzoxazole, and so on.

5. High Polymer Compounds having therein the amino group such as, for example, urea-formaldehyde resin, melamine formaldehyde resin, polyacryl amide, polyamide resin, polyethylene imine, polyvinyl pyridine, p-amino-polystyrene, polyurethane, gelatine, casein, and so forth.

6. Phenol-Type Reducing Agents such as, for example, hydroquinone, pyrogallol, gallic acid, α-naphthol, p-cresol, chlorofucinol, and so on.

7. Quaternary Ammonium-Type High Polymer Compounds such as, for example, polyvinyl-trimethyl-ammonium chloride, polyvinyl benzyltrimethyl ammonium chloride, poly (N-methylvinyl-pyridinium chloride), poly (N-vinyl-2, 3-dimethylimidazolinium chloride), poly (diallyl ammonium chloride), polyallyl trimethyl ammonium chloride, and so forth.

Besides the above-enumerated compounds, N-N-bis-acryl amide monomer, maleic anhydride, and so forth are also effective, when they are used together with graphite fluoride.

Furthermore, the present invention provides favorable result when compounds which contain zeolitic water are used with the graphite fluoride.

Compounds which contain zeolitic water to be used in the present invention have the following properties;

1. The compound is provided within its structure with "pores" or "cavities", in which water is held loosely (hereinafter this water is referred to as "zeolitic water"). Even in this state of containing a sufficient quantity of zeolitic water within these pores or cavities, the compound does not exhibit "stickiness" as seen in the hygroscopic and efflorescent phenomena which is generally shown by sodium chloride, and like salts, but maintains an apparent dry state.

2. The compound does not lose its crystal structure, even when the zeolitic water it contains is completely removed by heat, reduced pressure, or any other expedients.

3. The compound, from which zeolitic water has been perfectly removed, immediately absorbs water again even at low humidity to promptly return the compound to its original staturated state.

4. The compound exhibits good electric conductivity since zeolitic water and various kinds of ions co-exist in the compound.

5. Most of the compounds are white in color, a characteristic which is highly desirable for the recording material.

Examples of compounds which can be used in the practice of the present invention are enumerated below. Various kinds of condensed acids are useful, of which natural zeolite minerals are the most typical. Such natural zeolite minerals are generally called aluminium silicate an can be represented by the following general formula: $(M^{2+}, 2M^+) O.Al_2O_3 . mSiO_2.nH_2O$ ($3 \leq m \leq 10$), where $M^{2+}$ and $M^+$ indicate respectively divalent and monovalent metal ions, which are usually $Ca^{2+}$ and $Na^+$, and rarely $Sr^{2+}$, $Ba^{2+}$, and $K^+$, all being capable of replacing with other cations. These zeolite minerals have specific pores or cavities in their three dimensional skeleton structure, in which the above-mentioned replaceable cations are held together with water molecules. Besides water, general solvents may be absorbed in these cavities, and solvents of stronger polarity can be preferentially absorbed.

Besides natural zeolite minerals, there exist many kinds of synthetic zeolites which have substantially the same three-dimensional skeleton structure as that of the natural zeolites, and which are not much different from the natural zeolite with respect to their basic properties.

Further, there are natural and synthetic compounds which have chemical compositions completely different from zeolite, but which still have the same basic properties as those of zeolite, i.e., they have pores as does zeolite, and they do not change their crystal structure in their absorption and desorption of water. These compounds are called zeolite-like compounds and are equally useful for the purpose of the present invention.

Zeolites both natural and synthetic to be used in the present invention may be classified as follows from the standpoint of their chemical structures.

| (1) | Analcime Group | |
| --- | --- | --- |
| | Analcite | $NaAlSi_2O_6.H_2O$ |
| | Pollucite | $(Cs,Na)AlSi_2O_6.x\ H_2O\ (x < 1.0)$ |
| | Viseite | $Ca_{10}Na_2Al_{10}Si_6P_{10}(H_3)_{12}(H_2O)_{16}.O_{96}$ |
| | Kehoesite | $Zn_{5.5}Ca_{2.5}Al_{16}P_{16}(H_3)_{16}(H_2O)_{32}O_{96}$ |
| (2) | Sodalite Group | |
| | Hydrosodalite | $Na_8(Al_6Si_6O_{12})(OH)_2$ |
| | Faujasite | $Na_{28.8}Ca_{14.8}(Al_{57.6}Si_{134.4}O_{384}).262.3H_2O$ |
| | Molecular sieve A* | $Na_{12}(Al_{12}Si_{12}O_{24})NaAlO_2.29H_2O$ |
| | Molecular sieve X* | $Na_2(Al_2Si_{2.8}O_{9.6}).x\ H_2O\ (x{\approx}6)$ |
| | Molecular sieve Y* | $Na_2O.Al_2O_3.3{\sim}6\ SiO_2.x\ H_2O$ |
| | Molecular sieve SK* | substantially same as Faujasite |

*synthetic zeolite manufactured by Union Carbide Corporation, U.S.A.

| (3) | Chabazite Group | |
| --- | --- | --- |
| | Chabazite | $(Ca.Na_2)Al_2Si_4O_{12}.6H_2O$ |
| | Gmelinite | $(Na_2.Ca)Al_2Si_4O_{12}.6H_2O$ |
| | Erionite | $(Ca.Mg.Na_2K_2)Al_2Si_4O_{12}.6H_2O$ |
| | Levynite | $Ca(Al_2Si_4O_{12}).6H_2O$ |
| | Molecular sieve R* | the same as Chabazite |
| | Molecular sieve S* | the same as Gmelinite |
| | Molecular sieve T* | the same as Elionite |

*synthetic zeolite manufactured by Union Carbide Corporation, U.S.A.

| (4) | Natrolite Group | |
| --- | --- | --- |
| | Natrolite | $Na_2(Al_2Si_3O_{10}).2H_2O$ |
| | Mesolite | $Na_2Ca_2(Al_6Si_9O_{30}).8H_2O$ |
| | Scolecite | $Ca(Al_2Si_3O_{10}).3H_2O$ |
| | Thomsonite | $NaCa_2(Al_5Si_5O_{20}).6H_2O$ |
| | Edingtonite | $Ba(Al_2Si_3O_{10}).4H_2O$ |
| | Gonnardite | $Na_2Ca(Al_4Si_6O_{20}).6H_2O$ |
| | Rhodesite | $KNaCa_2(H_2Si_8O_{20}).5H_2O$ |
| | Mountainite | $KNa_2Ca_2(HSi_8O_{20}).5H_2O$ |
| (5) | Harmotome Group | |
| | Harmotome | $Ba_2(Al_4Si_{12}O_{32}).4H_2O$ |
| | Phillipsite | $(K_xNa_{1-x})_5Al_5Si_{11}O_{32}.10H_2O$ |
| | Gismondite | $Ca(Al_2Si_2O_8).4H_2O$ |
| | Molecular sieve B* | $Na_2(Al_2Si_3O_{10}).5H_2O$ |
| | Garronite | $NaCa_{2.5}(Al_3Si_5O_{16})_2.13.5H_2O$ |

*synthetic zeolite manufactured by Union Carbide Corporation, U.S.A.

| (6) | Mordenite Group | |
| --- | --- | --- |
| | Mordenite | $Na(AiSi_5O_{12}).3H_2O$ |
| | D'achiardite | $(Na_2Ca)_2Al_4Si_{20}O_{48}.12H_2O$ |
| | Ferrierite | $Na_{1.5}Mg_2(Al_{5.5}Si_{30.5}O_{72}).18H_2O$ |
| | Zeolon* | the same as Mordenite |

*a product of Norton Co.

| (7) | Zeolite of Non-Determined Structure | |
| --- | --- | --- |
| | Heulandite | $Ca(Al_2Si_7O_{18})6H_2O$ |
| | Clinoptilotite | $Na_{0.95}K_{0.30}Ca_{0.5}(Al_{1.35}Si_{7.65}O_{18})5H_2O$ |
| | Stilbite | $Ca(Al_2Si_7O_{18})7H_2O$ |
| | Epistilbite | $Ca(Al_2Si_6O_{16}).5H_2O$ |
| | Brewsterite | $(Sr,Ba,Ca)Al_2Si_6O_{16}.5H_2O$ |
| | Laumontite | $Ca(AlSi_2O_6)4H_2O$ |
| | Yugawaralite | $Ca(Al_2Si_5O_{14})3H_2O$ |

-continued

| | | |
| --- | --- | --- |
| | Paulingite | $(K,Ca,Na)_{120}[(Al,Si)_{580}O_{1160}]690H_2O$ |
| | Aschroftine | $[KNa(Ca,Mg,Mn)]_{120}(Al_{160}Si_{200}O_{720})320H_2O$ |
| | Bikitaite | $LiAlSi_2O_6.H_2O$ |

The above enumerated compounds are all applicable to the present invention.

The following are examples of zeolite-like compounds:

8. ZEOLITE-LIKE COMPOUNDS

8-1. Zeolite-like Silicates

They are not classified as zeolite, but contain zeolitic water.

| | | |
| --- | --- | --- |
| | Beryl | $Al_2Be_3[Si_6O_{18}].nH_2O$ |
| | Cordierite | $Mg_2Al_3[AlSi_5O_{18}]nH_2O$ |
| | Milarite | $KCa_2AlPe_2[Si_{12}O_{30}]O.5H_2O$ |
| | Osumilite | $(K,Na,Ca)(Mg,Fe)_2[Al,Fe)_3[(Si,Al)_{12}O_{30}]H_2O$ |
| | Hydrated Nepheline | $KNa_3(Al_4Si_4O_{16}).nH_2O$ |
| | Cancrinite | $Na_6Ca_6(Al_6Si_6O_{24})CO_3.3H_2O$ |
| | Buddingtonite | $NH_2AlSi_3O_8.O.5H_2O$ |
| (8-2) | Other Zeolite-like Compounds | |
| (I) | Germanate | $M_3[HGe_4(GeO_4)_3O_4].4H_2O$ where M is a metal ion. |
| (II) | Phosphate & Arsenate: | |
| | Scorodite | $FeAsO_4.2H_2O$ |
| | Pharmacosiderite | $K[Fe_2(OH)_4(AsO_4)_3].6{\sim}7H_2O$ |
| (III) | Water-Containing Metal Oxide: | |
| | Psilomelane | $(Ba.H_2O)_2.Mn_5O_{10}$ |
| (IV) | Three Dimensional Complex: | |
| | Prussian blue | $M_3[Fe(CN)_6]_2.12H_2O$ where: $M = Mn.Fe.Co.Ni.Zn.Cd$ |
| | Weddellite | $CaC_2O_4.(2-x).H_2O\ (x \leq 0.5)$ | the above-enumerated compounds are all applicable to the present invention. In particular, when they are used for the image recording member according to this invention, which is then subjected to the electrically conductive recording, these compounds should preferably possess large cavity volume, or porosity resulting in a high content of zeolitic water and good electric conductivity. In addition, a high degree of whiteness is preferable.

Most of the compounds containing zeolitic water for use in the present invention have a high degree of whiteness which is very suitable as the recording material. Even when graphite fluoride with a low degree of whiteness (i.e., those having incomplete fluorination) is used, the desired color tone may be maintained by additionally using compounds containing zeolitic water.

While the construction and method for production of the image recording member according to the present invention differs slightly depending on its intended use such as whether the member is used as a heat-sensitive recording material, or as an electrically sensitive material, or as a photosensitive material, such recording member can be produced in a fundamentally similar manner by dissolving or uniformly dispersing the above mentioned graphite fluoride and the abovementioned fluorine acceptor into an appropriate matrix (or a binder) — some of the fluorine acceptor also serves as the binder, and forming this solution or dispersion into a sheet-like product by itself, or by applying it to any appropriate supporting body, or by impregnating such supporting body with the solution or dispersion, and any other expedients.

The binders to be used for the present invention include the following various compounds;

a. Natural high polymers such as gelatine, starch, and so on.

b. Cellulose derivatives such as cellulose nitrate, carboxy-methyl cellulose, and so on.

c. Semi-synthetic polymers such as natural rubber plastic material, e.g., rubber chloride, cyclized rubber, and so on.

d. Polymerization type synthetic high polymers such as polyiso-butylene, polystyrene, terpene resin, polyacrylic acid, polyacrylate, polymethacrylate, polyacrylonitrile, polyacrylamide, polyvinyl acetate, polyvinyl alcohol, polyvinyl pyrrolidone, polyacetal resin, polyvinyl chloride, polyvinyl pyridine, polyvinyl carbazole, polybutadiene, poly(styrenebutadiene), butyl rubber, polyoxymethylene, polyethylene amine, polyethylene imine hydrochloride, poly(2-acryloxyethyl dimethyl sulfonium chloride), and so forth.

e. Polycondensation type high polymers such as phenolic resin, amino resin, toluene resin, alkyd resin, unsaturated polyester resin, allyl resin, polycarbonate, polyamide resin, polyether resin, sillicone resin, furan resin, thiocol rubber, and so forth.

f. Addition-polymerization type resins such as polyurethane, polyurea, epoxy resin, and so on.

For the supporting body or substrate, there may be used paper, resin film, metal sheet, paper coated with a thin material film, paper having thereon vapor-deposited metal, paper coated with metal powder, conductive paper treated with carbon, and so forth.

In particular, when the image recording member according to the present invention is used as the electrically conductive recording material, any pigment which has been rendered electrically conductive, metal powder, and other electrically conductive medium may be made co-existent in the recording layer besides the above mentioned graphite fluoride and the fluorine acceptor. In addition to these, there can, of course be added appropriate additives such as a hiding agent, dispersant, color-adjusting agent, and so forth.

For an image to be recorded on the image recording member obtained in the above-described manner, appropriate energy may be imparted to this image recording member in accordance with the image information such as heat energy through a heat pen, etc. or electric conduction through a recording needle, or stylus, or irradiation of light such as laser beam, infrared ray, etc. The following examples are illustrative only, and they do not intend to limit the scope of the present invention.

EXAMPLE 1

Dispersion liquid was prepared by uniformly and sufficiently agitating the following ingredients in a steel ball dispersing device.

30% solution (isopropyl alcohol/toluene; 1 : 1) of polyamide resin (a product of General Mills, Inc., and available under a tradename of "VERSALON DDX 1112") — 100g Graphite fluoride (raw material carbon-binder carbon, having the fluorination rate of 100%) —30g Subsequently, this dispersion liquid was applied to a sheet of paper of good quality by means of a coating rod, after which the coated substrate was dried in an oven kept at a temperature of 80°C to obtain white recording paper.

When the thus obtained recording paper was scanned thereon with a heat pen heated to a temperature of approximately 200°C, the scanned portion of the white recording paper turned to black, whereby a recorded image of good quality was obtained. The contrast between the recorded image and the background, i.e., the image density background density, in this case, was approximately 1.0/0.2 (D max value).

Further and comparative experiments were conducted as to the image recordability of the image recording member prepared by using the graphite fluoride obtained from different raw material carbon with varied rate of fluorination. The results are as shown in the following Table 1.

Table 1

| Specimen No. | Raw Material Carbon | Rate of Fluorination (%) | Recordability |
| --- | --- | --- | --- |
| 1 | Binder carbon | 95 | Very good |
| 2 | Binder carbon | 75 | Good |
| 3 | Binder carbon | 50 | Poor, but recordable |
| 4 | Charcoal | 100 | Very good |
| 5 | Charcoal | 90 | Very good |
| 6 | Petroleum coke | 100 | Very good |
| 7 | Petroleum coke | 80 | Good |
| 8 | Carbon black | 100 | Very good |
| 9 | Carbon black | 60 | Poor, but recordable |
| 10 | Natural graphite | 100 | Good |
| 11 | Coal coke | 90 | Good |
| 12 | Binder carbon + Charcoal (1:1 in weight ratio) | 100 | Very good |
| 13 | Carbon black + Petroleum coke (3:2 in weight ratio) | 100 | Very Good |

EXAMPLE 2

Dispersion liquid was prepared by uniformly agitating the following ingredients in a ball mill over two days and nights.

Zeolite (a product of Union Carbide Corp., U.S.A., and available under a trademark of "Molecular Sieve SK-40") — 100g Graphite fluoride (raw material carbon: binder carbon + coal coke at a weight rate of 3 : 2, the fluorination ratio being 100%) — 20g Water — 80g After this, 20g of the dispersion liquid was added to a 20% aqueous solution of casein and the batch was sufficiently mixed by a stirrer. Subsequently, this mixed solution was applied to a sheet of aluminium laminate paper by means of a coating rod, followed by drying the coated sheet at a temperature of approximately 80°C to obtain a white electrically conductive recording sheet.

The side of the aluminium layer of the thus obtained recording sheet was connected to a negative (−) polarity, while a tungsten stylus of 0.2mm in diameter to a positive (+) polarity, and the coated surface of the recording sheet was scanned by this stylus, while impressing a voltage of about 250 volts. As the result of this, an image of good quality in blackish brown was recorded on the white background of the recording sheet.

Also, when this recording sheet was scanned on its surface with a heat pen heated to a temperature of about 200°C, the scanned portion turned to blackish brown to perform satisfactory image recording. The image density background density, at this time, was approximately 1.0/0.2 (D max value)

EXAMPLE 3

Dispersion liquid was prepared by uniformly agitating the following ingredients in a ball mill over three days and nights.

Zeolite (a product of Union Carbide Corp., U.S.A., and available under a trademark of Molecular Sieve 13X) — 100g Polyvinylbutyral (a product of Sekisui Kagaku K.K., Japan, and available under a trademark of "Esurekku (S-lec) BL-1" — 10g Graphite fluoride (raw material carbon: petroleum coke, having fluroination rate of 100%) — 20g Ethanol — 90g To 22g of the thus prepared dispersion liquid, there were added various fluorine acceptors in an amount of 1g, and the image recording sheets were produced in the same manner as described in the preceding Example 2, which were then subjected to the recording test. The results are as shown in the following Table 2.

Table 2

| Specimen No. | Fluorine Acceptor | Image Color | Recordability |
| --- | --- | --- | --- |
| 1 | Dodecamethylene diamine | Blackish Brown | Very good |
| 2 | Triallyl amine | Blackish brown | Good |
| 3 | 1-carbamylethylene imine | Blackish brown | Good |
| 4 | Dimethyl glycine | Greyish black | Good |
| 5 | α-aminopropionic acid | Greyish black | Good |
| 6 | Diphenylamine | Blackish brown | Not bad, recordable |
| 7 | Acetoanilide | Greyish black | Good |
| 8 | α-acetylphenyl hydrazine | Blackish brown | Not bad, recordable |
| 9 | Succinic acid imide | Blackish brown | Not bad, recordable |
| 10 | Hexamethylene tetramine | Blackish brown | Good |
| 11 | Pyrazine | Blackish brown | Not bad, recordable |
| 12 | Carbazole | Blackish brown | Not bad, recordable |
| 13 | Melamine formaldehyde resin | Black | Very good |
| 14 | Polyacylamide | Blackish brown | Good |
| 15 | Polyallyltrimetyl-ammonium chloride | Black | Very good |

EXAMPLE 4

The heat recording was conducted in the exactly same manner as had been done in Example 1 with the exception that various kinds of fluorine acceptor as shown in the following Table 3 were used (weight ratio between the fluorine acceptor and the matrix (binder) resin being 1 : 1). The results are as follows.

Table 3

| Specimen No. | Fluorine Acceptor | Matrix Resin | Solvent | Recordability |
| --- | --- | --- | --- | --- |
| 1 | Polyamide copolymer (a product of Badisch Anilin und Soda Fabrik, West Germany, and available under a trademark of "ULTRAMID IC") | — | Methanol toluene | Good |
| 2 | Nylon 12 (a product of Toray Co., Japan and available under a trademark of "SP-500 NYLON") | — | Xylol | Very good |
| 3 | Quaternary ammonium salt electrically conductive high polymer (a product of Dow Chemical Co. U.S.A. and available under a trademark of "ECR-34") | — | Water/methanol | Good |
| 4 | Triphenylamine | Polyvinyl butyral | Ethanol | Good |
| 5 | α-naphthol | Polyvinyl butyral | Ethanol | Not bad, recordable |
| 6 | Acetoamide | Polyvinyl butyral | Ethanol | Good |

EXAMPLE 5

Dispersion liquid was prepared by uniformly and sufficiently agitating in a steel ball dispersing device the following ingredients:

1. 40g of mixture compound consisting of:
   Graphite fluoride (raw material carbon-binder carbon, having the rate of fluorination of 100%) — 20g
   Various compounds containing therein zeolitic water as shown in the following Table 4 — 100g
   added to:

2. 100g of 30% solution (isopropyl alcohol/toluene at a weight ratio of 1 : 1) of polyamide resin (a product of General Mills, Inc., and available under a trademark of VERSALON DDX 1112)

Subsequently, this dispersion liquid was applied to a sheet of aluminium laminate paper by means of a coating rod, and the coated substrate was dried for 5 minutes at a temperature of 100°C.

Then, the electric conduction recording was carried out by scanning the thus obtained recording sheet on its coated surface with a tungsten stylus, while applying a direct current voltage of about 150 volts across the electrodes. In this case, the tungsten stylus was connected to the negative (−) polarity, and the aluminium layer side of the recording sheet of the positive (+) polarity. The test results are as shown in the following Table 4.

Table 4

| Specimen No. | Compound Containing Therein Zeolitic Water | Recordability |
| --- | --- | --- |
| 1 | Molecular sieve SK-40 | Very good |
| 2 | Molecular sieve 13X | Very good |
| 3 | Molecular sieve 5A | Good |
| 4 | Weddellite | Good |
| 5 | Gismondite | Recordable |
| 6 | Chabazite | Recordable |
| 7 | Scorodite | Recordable |
| 8 | Clinoptilotite | Recordable |
| 9 | Mordenite | Recordable |
| 10 | Natrolite | Recordable |
| 11 | Analcite | Recordable |
| 12 | Psilomelane | Recordable |
| 13 | Cancrinite | Recordable |

Further, abovementioned dispersion liquid were applied on sheets of good quality paper by means of coating rod, and dried in an oven maintained at a temperature of 80°C to produce the recording sheets. The thus obtained recording sheets were subjected to recording by means of a heat pen heated to a temperature of approximately 200°C. The recordability of such recording sheets from the specimen No. 1 through No. 13 was found satisfactory.

EXAMPLE 6

Using the recording sheet obtained in Example 1, the surface side of the recording layer on the recording sheet was scanned with a beam of 100 microns in diameter by using 3W carbon dioxide gas laser. The result of this photosensitive recording revealed that the scanned portions on the recording sheet by this irradiation developed in black and the recorded image of good quality was obtained.

We claim:

1. A method for forming an image on an image recording member comprising the step of applying energy to a recording layer comprising at least one kind of graphite fluoride and at least one kind of fluorine acceptor, both being the effective components of said image recording layer.

2. The method according to claim 1, wherein said energy is external heat.

3. The method according to claim 1, wherein said energy is electric current.

4. The method according to claim 3 wherein said electrical current is applied from a stylus to said recording layer.

5. The method according to claim 1, wherein said energy is light rays.

6. An image recording member which comprises a recording layer comprising at least one kind of graphite fluoride and at least one kind of binding agent, both being the effective components for said image recording layer.

7. The image recording member according to claim 6 wherein said binding agent exhibits electroconductivity.

8. An image recording member which comprises a recording layer comprising at least one kind of graphite fluoride, and at least one kind of fluorine acceptor, both being the effective components for said image recording layer.

9. The image recording member according to claim 8, wherein said recording layer further contains at least one kind of substance selected from compounds containing therein zeolitic water.

10. The image recording member according to claim 9, wherein said compounds containing therein zeolitic water are zeolite minerals.

11. The image recording member according to claim 9, wherein the rate of fluorination of the inorganic high molecular carbon fluoride is not less than 40%.

12. The image recording member according to claim 9, wherein the substance containing zeolitic water is selected from the group consisting of a compound from the analcime group, the sodalite group, the chabazite group, the natrolite group, the harmotome group and the modenite group.

13. The image recording member according to claim 8, wherein said recording layer further contains a binding agent.

14. The image recording member according to claim 13, wherein said binding agent is a natural high molecular weight polymer.

15. The image recording member according to claim 13, wherein said binding agent is a cellulose derivative.

16. The image recording member according to claim 13, wherein said binding agent is a semi-synthetic polymer.

17. The image recording member according to claim 13, wherein said binding agent is a polymerization-type synthetic high molecular weight polymer.

18. The image recording member according to claim 13, wherein said binding agent is a polycondensation-type high molecular weight polymer.

19. The image recording member according to claim 13, wherein said binding agent is a polymerization-type resin selected from the group consisting of polyurethane, polyurea and epoxy resin.

20. The image recording member according to claim 8, wherein the rate of fluorination of the graphite fluoride is not less than 30%.

21. The image recording member according to claim 8, wherein said fluorine acceptor is an aliphatic amine.

22. The image recording member according to claim 21, wherein said aliphatic amine is selected from the group consisting of dodecamethylene diamine, octadecamethylene diamine, N, N'diacetylethylene diamine, acetoamine, triallyl amine, N, N'-bis-3-aminopropylputrescine, 1-carbamylethylene imine, 1-para-toluenesulfonylethylene imine, 2-aminopropane-1, 3-diol, tris (oxymethyl) amino methane, and 1,2-diaminopropane-3-ol.

23. The image recording member according to claim 8, wherein said fluorine acceptor is an aromatic amine compound.

24. The image recording member according to claim 23, wherein said aromatic amine is selected from the group consisting of dianilinomethane, N, N'-diphenyl-1, 2-diaminoethane, anilinoacetone, diphenylamine, triphenylamine, formanilide, acetonanilide, ortho-phenylene diamine, meta-penylene-diamine, para-phenylene diamine, para-aminoacetoanilide, 2, 6-diamonetoluene, 4-aminodiphenyl amine, Michler's ketone, N-N-ethylene-bis-N-phenylhydrazine, tetramethyl-diaminodiphenyl methane, para-tolylhydrazine, diphenyl-nitrosoamine, 2-phenyl-semi-carbazide, and α-acetylphenyl hydrazine.

25. The image recording member according to claim 8, wherein said fluorine acceptor is an amino acid.

26. The image recording member according to claim 25, wherein said amino acid is selected from the group consisting of glycine, N-phenyl glycine, dimethyl glycine, imino-diacetic acid, quanidino acetic acid, and α-amino-propionic acid.

27. The image recording member according to claim 8, wherein said fluorine acceptor is a heterocyclic compound.

28. The image recording member according to claim 27, wherein said heterocyclic compound is selected from the group consisting of hexamethylene tetramine, N-phenyl-3-pyrazolidone, acridine, pyridine, phenazine, carbazole, phenothiazine, and benzoxazole.

29. The image recording member according to claim 8, wherein said fluorine acceptor is a polymeric substance having therein an amino group.

30. The image recording member according to claim 29, wherein said polymeric substance having therein an amino group is selected from the group consisting of urea-formaldehyde resin, melamine formaldehyde resin, polyacrylamide, polyamide resin, polyethylene imine, polyvinyl pyridine, p-amino-polystyrene, polyurethane, gelatin and casein.

31. The image recording member according to claim 8, wherein said fluorine acceptor is a quaternary ammonium type high molecular compound.

32. The image recording member according to claim 31, wherein said quaternary ammonium-type high molecular weight compound is selected from the group consisting of polyvinyltrimethyl-ammonium chloride, polyvinyl benzyltrimethyl ammonium chloride, poly (N-methylvinyl-pyridinium chloride), poly (N-vinyl-2, 3-dimethylimidazolinium chloride), poly (diallyl ammonium chloride) and polyallyl trimethyl ammonium chloride.

33. The image recording member according to claim 8, wherein said fluorine acceptor is a phenol type reducing agent.

34. The image recording member according to claim 33, wherein said phenol type reducing agent is selected from the group consisting of hydroquinone, pyrogallol, gallic acid, α-naphthol, p-cresol and chloroglucinol.

35. An image recording member according to claim 8, wherein said recording layer further contains an electrically conductive medium.

36. An image recording member according to claim 8, wherein said fluorine acceptor is capable of serving as a binding agent.

* * * * *

UNITED STATES PATENT OFFICE
CERTIFICATE OF CORRECTION

Patent No. 3,983,564   Dated September 28, 1976

Inventor(s) MITSUNOBU NAKAZAWA, ET AL. Page 1 of 2

It is certified that error appears in the above-identified patent and that said Letters Patent are hereby corrected as shown below:

Column 1, line 29, "in the for" should read --in the home for--;

Column 2, line 58, "general formula of" should read --general formula--;

Column 3, line 38, "substance" should read --substances--;

Column 3, line 48, "example" should read --examples--;

Column 4, line 3, "αacetyl" should read --α-acetyl--;

Column 5, line 59, "$Na(AiSi_5O_{12}) \cdot 3H_2O$" should read $$--Na(AlSi_5O_{12}) \cdot 3H_2O--;$$

Column 5, line 63, "$Ca(Al_2Si_7O_{18}16H_2O$" should read $$--Ca(Al_2Si_7O_{18})6H_2O--;$$

Column 6, line 22, "$KCa_2AlPe_2[Si_{12}O_{30}]O \cdot 5H_2O$" should read $$--KCa_2AlBe_2[Si_{12}O_{30}]O \cdot 5H_2O--;$$

Column 6, line 33, "where: M = Mn.Fe.Co.Ni.Zn.Cd" should read

--where: M = Mn,Fe,Co,Ni,Zn,Cd--;

UNITED STATES PATENT OFFICE
CERTIFICATE OF CORRECTION

Patent No. 3,983,564  Dated September 28, 1976

Inventor(s) MITSUNOBU NAKAZAWA, ET AL.  Page 2 of 2

It is certified that error appears in the above-identified patent and that said Letters Patent are hereby corrected as shown below:

Column 6, line 34, "$CaC_2O_4 \cdot (2-x) \cdot H_2O (x \leqq 0.5)$"

should read --$CaC_2O_4 \cdot (2+x) \cdot H_2O (x \leqq 0.5)$--;

Column 7, line 19, "polyethylene amine" should read --polyethylene imine--;

Column 9, lines 67 - 68, "ULTRAMID1C" should read --ULTRAMIDIC--;

Column 12, line 16, Claim 20, "30%" should read --50%--

Signed and Sealed this

Twenty-fifth Day of January 1977

[SEAL]

Attest:

RUTH C. MASON
Attesting Officer

C. MARSHALL DANN
Commissioner of Patents and Trademarks